No. 803,945. PATENTED NOV. 7, 1905.
M. WEINRICH.
PROCESS OF TREATING SUGAR BEETS.
APPLICATION FILED JAN. 23, 1905.
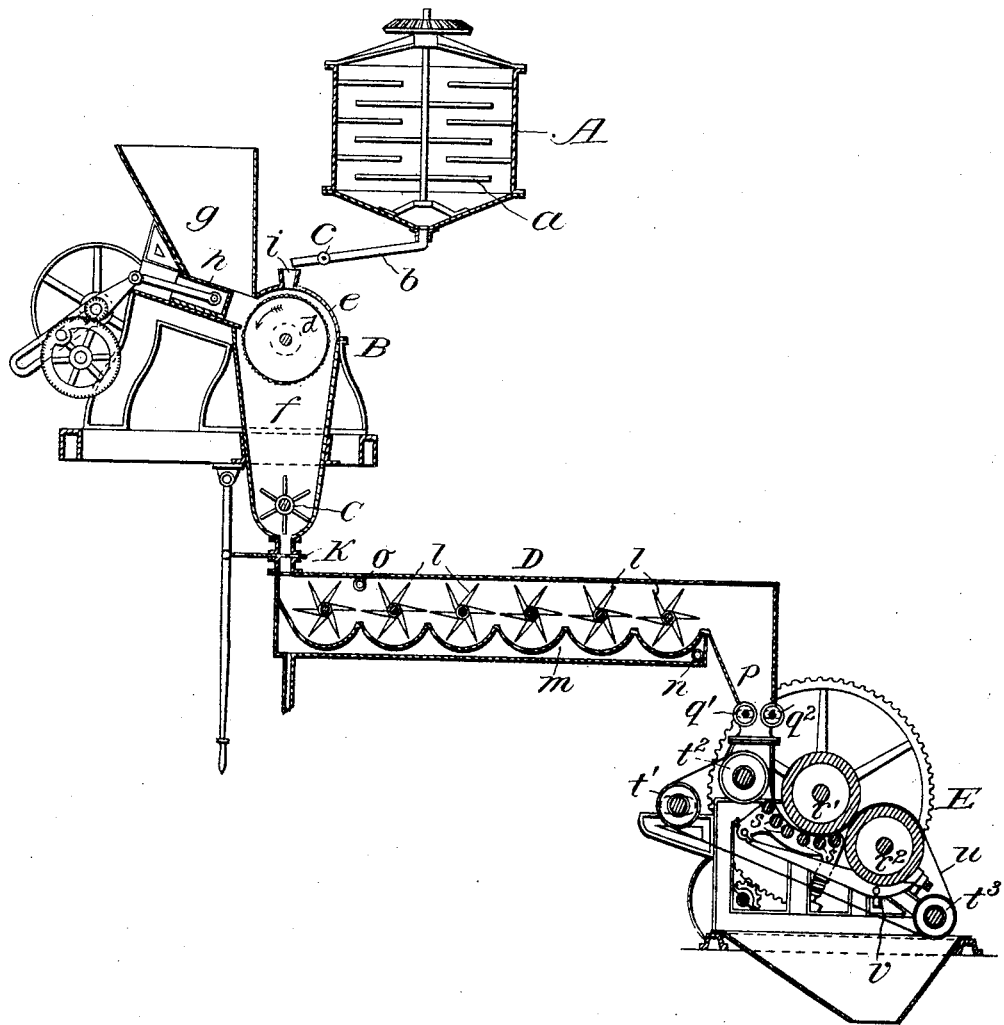
WITNESSES:
C. H. Walker
C. N. Fowler
INVENTOR
Moriz Weinrich
By
T. Walter Fowler
his Attorney

UNITED STATES PATENT OFFICE.

MORIZ WEINRICH, OF YONKERS, NEW YORK, ASSIGNOR OF ONE-THIRD TO WILHELM BAUR, OF NEW YORK, N. Y., AND ONE-THIRD TO CARL PORTIUS, OF CARO, MICHIGAN.

PROCESS OF TREATING SUGAR-BEETS.

No. 803,945.      Specification of Letters Patent.      Patented Nov. 7, 1905.

Application filed January 23, 1905. Serial No. 242,369.

*To all whom it may concern:*

Be it known that I, MORIZ WEINRICH, a citizen of the United States, residing at Yonkers, in the county of Westchester and State of New York, have invented new and useful Improvements in Processes of Treating Sugar-Beets, of which the following is a specification.

My invention relates to a new and useful process of treating sugar-beets or defecating the juice of sugar-beets before such juice is extracted; and my invention consists, primarily, in comminuting or reducing the beets to a mush and mixing therewith enough fluid matter—say cold milk of lime or a cold mixture of milk of lime and of defecated beet-juice—to render the mixture alkaline, then heating the mixture to defecate the same, and finally extracting the juice, as I will hereinafter describe, and point out in the claims.

In the accompanying drawing I have illustrated by a vertical sectional view a type of apparatus by means of which my process may be successfully carried out.

In a prior patent granted to me on the 22d day of December, 1903, No. 747,520, I disclose a process of treating sugar-cane, and I therein set forth a process by which the juice of sugar-cane may be defecated before the cane undergoes the ordinary milling operation. The principle disclosed in the prior patent may be utilized to great advantage in the treatment of sugar-beets or defecating the juice of such beets before the juice is extracted, although the different nature of the two raw materials—cane-juice and beet-juice—requires that they shall be differently treated.

In carrying out the present process I have found the following to be a preferred procedure when extracting juice from sugar-beets, reference being had to the drawing for a more complete understanding of the invention. Into a suitable tank A, I place thin milk of lime or a mixture of such milk and of defecated beet-juice, said tank being provided with appropriate stirring devices $a$. From the tank leads a pipe $b$, provided with a controlling cock or valve $c$, which regulates and controls the supply of milk of lime or mixture of milk of lime and of defecated beet-juice to a rasping-machine B, which, as shown, is of the type commonly employed in the beet-sugar industry, and which comprises, essentially, a rotatable drum $d$, having a large number of closely-set saw-blades, said drum being carried upon an appropriately-mounted shaft to which motion is transmitted in any well-known manner. The upper portion of the drum is covered by an appropriate hood $e$, and the lower portion of said drum operates in a suitable casing $f$. The rasping-machine has also a suitable hopper $g$, into which the beets are received and from which they are delivered to the rapidly-revolving drum by means of suitable pushers $h$, of which there may be one or more. The pusher is herein shown as of the reciprocating type operating across the open bottom of the hopper and adapted to feed the beets directly to the drum, whereupon the fine teeth of the saw-blades, with which the drum in practice is provided, act upon the beets to comminute them and reduce them substantially to a mushy consistency. During this comminuting process, the cock $c$ in the pipe $b$ being open, cold thin milk of lime and defecated beet-juice is running constantly from the tank and is being delivered through an inlet $i$ upon the revolving drum, thereby mixing with the beet-mush, the admixture dropping into the casing or chamber $f$, where a thorough and intimate mixing is effected by means of a rotatable mixer C, having arms operating in a trough at the bottom of the casing. The bottom of the trough is provided in its whole length with an opening or outlet, which is adjustable by means of a slide K or equivalent part and which permits the now thoroughly-mixed cold mush to be delivered into a heating-chamber D, which is interposed between the mixing chamber or trough and the expressing-press or roller-mill E, which I will presently describe. In practice I prefer that the trough, the heating-chamber, and the roller-mill shall have about the same width. The heating-chamber I prefer to construct of wrought or cast iron, with an inlet connecting with the mixing-trough and an outlet connecting with the roller-mill, and within the heating-chamber I locate a number of rotatable paddle-wheels $l$ or wheels having lifting-arms operated in any well-known and appropriate manner, said wheels adapted to advance the beet-mush while the same is in a heated condition from the trough to the roller-mill. I also prefer to construct the heating-chamber with a double bottom $m$, in which steam is admitted through a pipe $n$ for heating purposes, and to obtain a uniform advance movement of the mush through the chamber and to provide a maximum heating-surface I prefer to make the bottom of the chamber under each paddle-wheel rounded or concave, as shown. In addition to the indirect heating of the chamber D by means of the aforesaid double bottom and steam-pipe $n$ I also prefer to employ a direct heating by steam in order to heat the beet-mush to the desired temperature in a given time. Therefore I let into the chamber D a perforated steam-pipe $o$, which extends across the whole width of the chamber. The heated beet-mush on being advanced through the heating-chamber falls into the hopper $p$ and between adjustably-mounted rollers $q'$ $q^2$ and by the latter is fed in a uniform thickness into the roller-mill E. This mill, which may represent any suitable mill or expressing-press, is herein shown as of the "Poizot" type commonly used in the sugar industry, and it comprises two large iron or steel rollers $r'$ $r^2$, a series of small rollers $s$, and the three wooden rollers $t'$ $t^2$ $t^3$, all appropriately journaled in suitable bearings, the said iron or steel rollers $r'$ $r^2$ being covered, if desired, with a layer of rubber or like material.

Over all of the rollers is run for their full width the endless cloth $u$, composed of wool or cotton or other suitable textile material. This cloth is designed to closely fit upon the rollers, and to effect this and take up any slack in the cloth I prefer in practice to mount the roller $t'$ in adjustable bearings. The roller-mill also has a trough into which the defecated juice is received and from which it passes to the carbonating-tanks, as I will presently describe.

The operation of my process may be described as follows: The sugar-beets, which have been previously washed in the usual manner, are delivered continuously into the hopper $g$ and delivered by the pusher mechanism against the fast-revolving drum $d$ and ground thereby into a fine pulp or mush. At the beginning of the operation before any defecated juice is available the tank A shall contain only a thin milk of lime of about 2.5° Baumé and which milk of lime is run continuously through the pipe $b$ upon the drum, where it mixes with the beet-mush. The inflow is regulated by the cock $c$ in such a manner that about forty pounds of milk of lime are used in every one hundred pounds of beets. As soon as some defecated juice is available I prefer to use a mixture of about fifteen pounds of milk of lime of 5° to 6° Baumé and about twenty-five pounds of defecated juice in every one hundred pounds of beets, because more concentrated juice is obtained in this manner. The amount of lime to be used is two-thirds to one per cent. of CaO of the weight of beets, according to their quality, which is fully sufficient to defecate completely the juices in the beet-mush and to render the defecated juice decidedly alkaline. I consider it quite essential that the milk of lime or the mixture of milk of lime and of defecated juice when used shall have a temperature below 30° centigrade when brought in contact with the beet-mush, for I have found that when mixing the same hot certain gummy matters (pectin and arabin) become dissolved and render later on the filtration through filter-presses almost impossible, making thereby the process of little value, if not absolutely worthless; but when mixing cold these gummy matters remain insoluble and the filtration of the defecated and carbonated juice is readily effected. In the trough $f$ the mixing process is conducted for a while, so that the milk of lime will thoroughly commingle with the beet-mush, and the lime will act on the cold juice of the mush and render it strongly alkaline. As soon as this is done the heating of the mush, and thereby the defecation of the juice contained in it, can begin. The prepared mush passes through the adjustable or gate-controlled passage between the mixing-chamber and the heating-chamber and enters the latter, as before explained. In the heating-chamber the beet-mush is treated to about 85° centigrade, whereby all the cells of the comminuted beets will burst and a complete defecation of the juice will take place. The bursting of the cells will render the mush quite soft, and since by the action of the lime on the juice the latter has lost all the viscosity so characteristic to raw beet-juice the extraction of the defecated juice by pressure is made much easier and more thoroughly than when pressing a cold and undefecated mush. The thus-treated mush is delivered into the roller-mill and passes between the system of rollers and the endless cloth, and the extraction of the juice is effected by the pressure between these parts. The extracted juice passes through the cloth and thence into a trough having a pipe $v$, through which this juice is conducted to the carbonating tank or tanks for further treatment. The remaining well-pressed pulp amounts only to about eighteen per cent. of the weight of the beets and contains about forty per cent. of dry substances. This pulp drops from the endless cloth after it has passed over the roller $t^3$, and said pulp may be re-pressed by saturating it first with water, and the juice obtained in this manner may be used instead of water in the preparation of the milk of lime. However, the extraction by a good single pressing will be found in most cases quite satisfactory, as the pulp will contain only about three per cent. of sugar, which is equal to about 0.5 per cent. of the weight of the beets. The pulp will contain all the matters precipitated by the action of the lime in the defecation, whereby the feeding value of such pulp is much greater than when the defecation is done after the extraction, as now carried out universally. The pulp is alkaline and will therefore keep sweet for a much longer period than the ordinary pulp. The extracted juice running from the mill or press into the carbonation-tanks is perfectly defecated and of a very light color. It is there heated up, some more lime added, and then carbonated in the usual manner. Generally from one-half to one per cent. less lime (in weight of beets) will produce the same purification than if the juice had been extracted by the diffusion process now universally in use.

It is obvious that instead of the hereinbefore-described Poizot press or mill an ordinary three-roller steel mill when provided with an endless cloth and means for tightening the same can be employed, and instead of the before-described devices for comminuting, for treating, and for heating the beets other suitable devices may be used.

The essential advantages of this process, compared with the diffusion process now commonly practiced, are the following: First, only about fifteen per cent. of water is required, as against about two hundred per cent.; second, there is no waste water, and therefore no losses of sugar and other matter by waste water; third, the whole operation from beets going into the "rasper" until the defecated juice enters the carbonation-tanks takes from seven to eight minuites, against over one hour to obtain raw, undefecated, diffusion-juice; fourth, the juice obtained is more concentrated, thus requiring less evaporation. It shows only about 2° Brix less than the juice in the beets against about 4° Brix less with diffusion; fifth, from one-half to one per cent. of lime is saved in carbonation; sixth, the pulp obtained by single pressing amounts only to about eighteen per cent. of weight of beets with about forty per cent. of dry substance. It is alkaline and keeps well. It contains all the organic and inorganic matter precipitated by the defecation, and its feeding value is therefore much greater. When drying such pulp, only one and one-half pounds of water has to be evaporated to obtain one pound of dry substance, while eight to nine pounds of water have to be evaporated to obtain one pound of dry substance from diffusion-pulp. The loss of sugar in pulp is not greater than the loss in pulp and waste water with diffusion. No more power, labor, and steam are required than with diffusion.

I am aware that it is not broadly new to use lime in various stages of the diffusion process. Therefore I do not claim such use of lime as my invention, the diffusion process being fundamentally different from what I have herein referred to as a "rasping" and "pressing" process.

Having thus described my invention, what I claim as new, and desire to secure by Letters Patent, is—

1. The described process of treating sugar-beets consisting in comminuting the beets and then mixing with the comminuted mass, while in a cold state, sufficient milk of lime to render the mass alkaline, then heating the mass and finally extracting the juice by pressure.

2. The described process of treating sugar-beets consisting in reducing the beets to a mushy consistency, then mixing therewith enough cold milk of lime to render the mixture alkaline, then heating the mixture to such a degree that the juice contained in it is completely defecated, and finally extracting this defecated juice by pressure.

In testimony whereof I have hereunto set my hand in presence of two subscribing witnesses.

MORIZ WEINRICH.

Witnesses:
LESLIE M. SAUNDERS
JAMES S. FITCH.